US009248768B2

(12) United States Patent  (10) Patent No.: US 9,248,768 B2
Kolb  (45) Date of Patent: Feb. 2, 2016

(54) VEHICLE SEAT AND METHOD FOR CUSHIONING TWO SPRING PARTS WHICH ARE MOVABLE RELATIVE TO EACH OTHER

(71) Applicant: GRAMMER AG, Amberg (DE)

(72) Inventor: Jens Kolb, Koenigstein (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/294,356

(22) Filed: Jun. 3, 2014

(65) Prior Publication Data

US 2014/0354030 A1 Dec. 4, 2014

(30) Foreign Application Priority Data

Jun. 4, 2013 (DE) .......................... 10 2013 105 720
Sep. 19, 2013 (DE) .......................... 10 2013 110 358
Sep. 19, 2013 (DE) .......................... 10 2013 110 370

(51) Int. Cl.
*B60N 2/42* (2006.01)
*B60N 2/427* (2006.01)
(Continued)

(52) U.S. Cl.
CPC .............. *B60N 2/52* (2013.01); *B60N 2/4214* (2013.01); *B60N 2/501* (2013.01); *B60N 2/502* (2013.01);
(Continued)

(58) Field of Classification Search
CPC ............ B60N 2/52; B60N 2/54; B60N 2/502; B60N 2/501; B60N 2/522; B60N 2/525; B60N 2/544; B60N 2/509; B60N 2/4214
USPC ............... 297/216.1, 216.15, 216.16, 216.17, 297/216.18
See application file for complete search history.

(56) References Cited

U.S. PATENT DOCUMENTS 3,732,944 A * 5/1973 Kendall .................. 297/216.1 X
5,273,240 A * 12/1993 Sharon .................. 297/216.17 X
(Continued)

FOREIGN PATENT DOCUMENTS

DE         141769      5/1980
DE     102004013308   12/2005
(Continued)

OTHER PUBLICATIONS

Official Action (no English translation available) for German Patent Application No. 102013110358.8 dated Feb. 6, 2014, 3 pages.
(Continued)

*Primary Examiner* — Rodney B White
(74) *Attorney, Agent, or Firm* — Sheridan Ross P.C.

(57) ABSTRACT

A vehicle seat having a seat part extending in the vehicle lengthwise direction (X) and in the vehicle width direction (Y) and having a backrest part and a seat substructure for cushioning and/or damping at least the seat part with respect to a body of a vehicle, in which the seat substructure comprises at least one horizontal spring device having a first spring part and a second spring part that is movable relative thereto and a deformable fluid spring element for cushioning the seat part with respect to the body in the vehicle lengthwise direction (X) and/or in the vehicle width direction (Y), the deformable fluid spring element being arranged with a first connecting region to the first spring part and a second connecting region to the second spring part, wherein the deformable fluid spring element is arranged between the first and second spring parts so as to be deformed solely by the first and second spring parts upon relative movement of the first and second spring parts relative to each other.

20 Claims, 2 Drawing Sheets

(51) Int. Cl.
  *B60N 2/52* (2006.01)
  *B60N 2/54* (2006.01)
  *F16F 13/00* (2006.01)
  *B60N 2/50* (2006.01)
  *B60N 2/02* (2006.01)

(52) U.S. Cl.
  CPC ............... *B60N 2/509* (2013.01); *B60N 2/522* (2013.01); *B60N 2/525* (2013.01); *B60N 2/54* (2013.01); *B60N 2/544* (2013.01); *F16F 13/002* (2013.01); *B60N 2002/0212* (2013.01); *B60N 2002/0216* (2013.01)

(56) References Cited

U.S. PATENT DOCUMENTS

| | | | | |
|---|---|---|---|---|
| 5,290,089 | A * | 3/1994 | Oleszko et al. | 297/216.1 X |
| 5,538,117 | A * | 7/1996 | Bouchez | 297/216.1 X |
| 5,871,257 | A | 2/1999 | Dundes, Sr. | |
| 7,341,645 | B2 * | 3/2008 | Fong | 297/216.16 X |
| 8,439,420 | B2 * | 5/2013 | Cantor et al. | 297/216.17 X |
| 2001/0015565 | A1 * | 8/2001 | Motozawa et al. | 297/216.18 X |
| 2002/0145315 | A1 * | 10/2002 | Fraley et al. | 297/216.15 X |
| 2008/0156602 | A1 * | 7/2008 | Hiemenz et al. | 297/216.1 X |
| 2011/0006567 | A1 * | 1/2011 | Mullen | 297/216.1 |
| 2011/0018316 | A1 * | 1/2011 | Meredith et al. | 297/216.1 |

FOREIGN PATENT DOCUMENTS

| | | |
|---|---|---|
| DE | 102005011856 | 8/2006 |
| DE | 102010033419 | 2/2012 |
| DE | 102010051325 | 5/2012 |
| DE | 102010055342 | 6/2012 |
| DE | 102010055344 | 6/2012 |
| EP | 2468568 | 6/2012 |
| EP | 2468567 | 6/2013 |
| FR | 1364719 | 6/1964 |

OTHER PUBLICATIONS

Extended European Search Report (no English translation available) for German Patent Application No. 102013110358.8, dated Jan. 8, 2015, 6 pages.

* cited by examiner

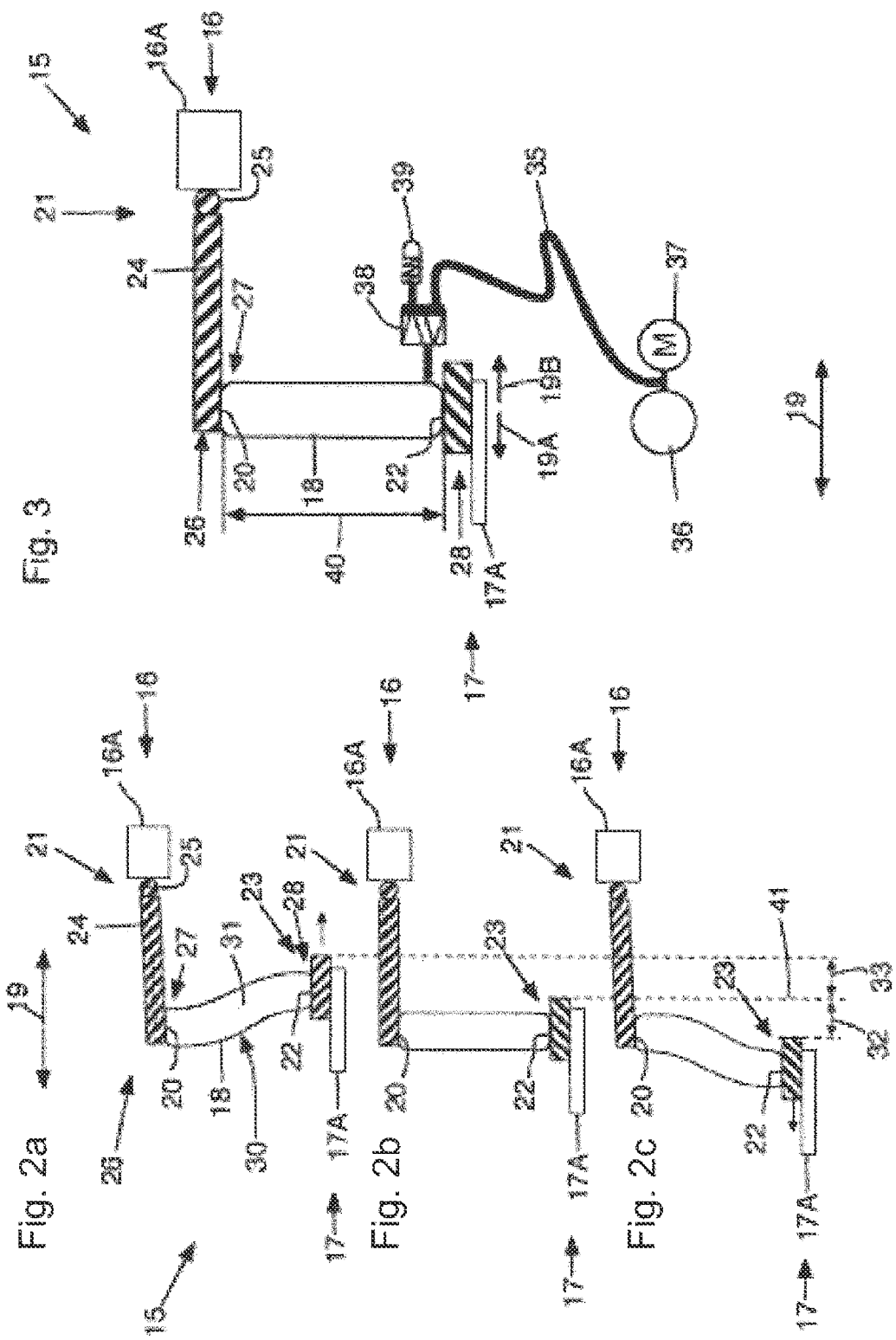

VEHICLE SEAT AND METHOD FOR CUSHIONING TWO SPRING PARTS WHICH ARE MOVABLE RELATIVE TO EACH OTHER

CROSS-REFERENCE TO RELATED APPLICATIONS

This application claims the benefit of German Patent Application No. 10 2013 105 720.9 filed Jun. 4, 2013; German Patent Application No. 10 2013 110 370.7 filed Sep. 19, 2013; and German Patent Application No. 10 2013 110 358.8 filed Sep. 19, 2013, the entire disclosures of each of which are incorporated by reference herein.

FIELD

A vehicle seat in which the seat substructure comprises a horizontal spring device.

BACKGROUND

Generic vehicle seats are already well known in the art. They are expediently often used in all-terrain motor vehicles and utility motor vehicles so as in particular to offer a driver maximum driving comfort even on rough terrain or dirt roads.

For this purpose these vehicle seats often comprise both horizontally and vertically acting cushioning and damping devices, which are used to support at least the seat part of the vehicle seat sufficiently well with respect to the body of the vehicle.

A seat substructure of the vehicle seat is often very large since the cushioning and/or damping devices occupy considerable space. For example, horizontal spring devices known in the art often require considerable space since they always use spring elements, such as helical spring elements, which are oriented in the cushioning direction. However, such an arrangement means that the horizontal spring device is either very large in order to achieve a particular spring characteristic in the cushioning direction or only a suitably smaller spring element can be used. If the latter option is chosen, however, the desired spring characteristic is often not achieved, or is achieved but only to an insufficient extent. Moreover, the spring characteristics of, in particular, the spring elements installed in the horizontal spring devices cannot be varied or influenced—or can be, but only to an insufficient extent. This means that the resulting spring characteristic cannot be optimally set.

A generic vehicle seat for a vehicle is also known from Offenlegungsschrift DE 10 2010 055 342 A1 and has, inter alia, a horizontal spring device comprising at least one fluid spring element which is actively variable in an absorptive volume and extends in an elongate manner between two attachment regions, onto which fluid spring element pressure forces can be applied obliquely to the lengthwise direction thereof by means of a deformation device for deforming, in particular for bending, the fluid spring element. Owing to the thus constructed spring device, a compact horizontal spring device can be integrated in the seat substructure below a seat part of the vehicle seat. Particularly owing to the fluid spring element used, the spring characteristic can additionally be set within certain limits, thereby effectively circumventing at least some of the disadvantages set out above.

SUMMARY

The invention relates to a vehicle seat having a seat part extending in the vehicle lengthwise direction and in the vehicle width direction and having a backrest part and a seat substructure for cushioning and/or damping at least the seat part with respect to a body of a vehicle, in which the seat substructure comprises at least one horizontal spring device having a first spring part, another spring part which is movable relative thereto and a deformable fluid spring element for cushioning the seat part with respect to the body in the vehicle lengthwise direction and/or in the vehicle width direction, the deformable fluid spring element being arranged with a first connecting region to the first spring part and another connecting region to the other spring part.

Furthermore, the invention relates to a method for cushioning two spring parts which are movable relative to each other and belong to a horizontal spring device of a vehicle seat having a seat part and a backrest part, in which the two spring parts are cushioned relative to each other by means of a deformable fluid spring element.

An object of the present invention is to achieve a more compact construction of generic vehicle seats, in particular the horizontal spring devices thereof.

The object of the invention is achieved by a vehicle seat having the features stated in claim 1.

The invention builds on the generic state of the art in that the deformable fluid spring element is arranged between the two spring parts so as to be deformed solely by these two spring parts upon relative movement of the two spring parts relative to each other. This allows the fluid spring element which is deformable solely by means of the two spring parts to be integrated more compactly into the vehicle seat, and in particular the seat substructure can be constructed with even fewer components.

Within the meaning of the invention, the first spring part is preferably an upper part of the horizontal spring device which is attached on the seat-part-side, this seat-part-side upper part being a component or assembly onto which the seat part is fitted. Optionally, the first spring part (or the seat-part-side upper part) directly comprises the seat part of the vehicle seat, thereby further simplifying the construction of the horizontal spring device.

The other spring part is preferably a lower part of the horizontal spring device which is attached on the body-side, this body-side lower part being a component or an assembly in the present case, which component or assembly is arranged on the vehicle body. Optionally, the other spring part (or the body-side lower part) directly comprises a portion of the body.

In light of the foregoing, the concepts "first spring part" and "seat-part-side upper part" are synonymous and thus interchangeable, as are "other spring part" and "body-side lower part".

Within the meaning of the invention, the term "horizontal spring device" describes a linear horizontal spring device which is used to resiliently support in particular the first spring part (or the seat-part-side upper part) by means of a spring component in the vehicle lengthwise direction and/or in the vehicle width direction with respect to the other spring part (or the body-side lower part), it being possible for the horizontal spring device to be designed so as to be either damped or undamped.

Within the meaning of the invention, the deformable fluid spring element constitutes a coupling device by means of which the first spring part (or the seat-part-side upper part) can be mechanically coupled with respect to the other spring part (or the body-side lower part) in such a way that the seat-part-side upper part and the body-side lower part are arranged so as to be movable relative to each other by means of a horizontal spring component.

As for a fluid spring element which is deformable solely by means of the two spring parts, a pneumatic spring element is ideal since it inherently has a response characteristic that is ideal for the present purpose.

It goes without saying that the deformable fluid spring element can have virtually any given shape, provided that cushioning can be ensured in the vehicle lengthwise direction and/or vehicle width direction.

Owing to the form or bodily shape and/or nature (inherent stiffness), in particular in relation to the materials used and optionally also in relation to intentionally arranged reinforcement or weakening regions or the like, a highly differentiated progression of the spring characteristic can be achieved in the case of shearing and/or an actively generated variation, increase or decrease in internal pressure.

The deformable fluid spring element preferably extends in an elongate manner transversely to the horizontal cushioning direction in the vehicle lengthwise direction or vehicle width direction. However, an alternative positioning can also be provided.

In the present case the fluid spring element which is deformable solely by means of the two spring parts can be attached by means of its first end to the first spring part via a first connecting region and by means of its second end, opposite the first end, to the other spring part via a second connecting region.

In this case the seat part is used to accommodate a person, in particular the driver, of a vehicle equipped with the vehicle seat according to the invention. Accordingly, the backrest part is used to support the back of the person occupying the seat part.

If the two connecting regions of the deformable fluid spring element are the sole engagement regions, in particular of the horizontal spring device, by means of which the deformable fluid spring element can be deformed upon relative movement of the two spring parts relative to each other, the horizontal spring device can be provided such that it consists of fewer components than previously conventional in the art.

It is thus advantageous for the deformable fluid spring element to be always held and guided solely by the two spring parts arranged with mutual spacing transversely to the main cushioning direction.

In this respect it is also advantageous for the deformable fluid spring element to have an elongate, tubular main body comprising an oblong, sealable cavity for accommodating a suitable cushioning fluid.

In the simplest case, air is a possible cushioning fluid, although other gases may also be used.

If the deformable fluid spring element is arranged so as to oscillate freely, at least in the main cushioning direction, between the two spring parts, it is entirely impossible for the deformable fluid spring element to be deformed by any other component aside from the two spring parts of the horizontal spring device. This can ensure that cushioning occurs solely as a result of shear forces of the deformable fluid spring element. Moreover, the deformable fluid spring element is prevented from being subjected to increased wear due to friction with other components. This leads to a considerable increase in the service life of the deformable fluid spring element.

The deformable fluid spring element can be integrated between the two spring parts in a manner that is particularly advantageous from a structural perspective if the deformable fluid spring element has an oblong configuration and is fixed to the two spring parts by means of each of its most spaced-apart end regions.

For this purpose, the connecting regions of the deformable fluid spring element are located at the two most spaced-apart end regions thereof.

An advantageous embodiment provides that the deformable fluid spring element is fixed at one of the two spring parts to a fixed bearing and at the other of the two spring parts to a floating bearing. Although the deformable fluid spring element is deformable per se and can thus execute compensatory movements, it is advantageous for it to be held in the horizontal spring device by means of a floating bearing/fixed bearing combination. This allows the deformable fluid spring element to be fixed to one spring part so as to be movable in rotation and to the other spring part in a stationary manner, for example.

The floating bearing preferably comprises a pivot joint, which allows additional length compensation of the deformable fluid spring element to be achieved transversely to the main cushioning direction in a structurally highly simple manner if the deformable fluid spring element is deformed upon a cushioning movement and/or the internal pressure is varied.

Particularly as a result of further limitation of movement in conjunction with a correspondingly designed floating bearing, in particular of the pivot joint, an additional progression can advantageously be achieved on the horizontal spring device if, for example, as a result of an increase in internal pressure, an expansion with respect to the cross section of the deformable fluid spring element acts as a force increase in the excursion as a result of a shortening of the longitudinal extension of the deformable fluid spring element.

It is advantageous for the deformable fluid spring element to have, at one of its ends, a length-compensating device which acts transversely to the main cushioning direction.

It goes without saying that this length-compensating device can have an alternative construction. A structurally robust and thus low-maintenance embodiment provides that the length-compensating device comprises a lever element which is hingedly arranged on one of the two spring parts. This lever element which is articulated in the manner of a pivot joint additionally allows the progression of the deformable fluid spring element to be influenced effectively in the case of a corresponding design.

Preferably, this lever arm articulated in the manner of a pivot joint is fixed to the first connecting region, that is to say, to the seat-part-side upper part of the horizontal spring device.

Another advantageous embodiment provides that the two connecting regions of the deformable fluid spring element are held on the two spring parts so as to be slidable in parallel to each other in the main cushioning direction.

As aforesaid, the connecting regions are ideally located in the end regions of the deformable fluid spring element, these end regions, particularly in the case of an oblong-shaped deformable spring element within the meaning of the invention, being those which are the most spaced apart.

In order to be able generate spring characteristics, which can be adjusted in various ways, on the deformable fluid spring element, it is advantageous for the deformable fluid spring element to comprise an oblong, tubular and resilient main body having a closed cavity which can be filled with a volume of cushioning fluid according to a measured spring path.

The object of the invention is additionally achieved by a method having the features stated in claim 11, the invention likewise also building on the relevant state of the art in that an internal pressure within the deformable fluid spring element is actively varied from the exterior according to an intensity of an introduced oscillation and/or a measured spring path in order to adapt the spring characteristic to the current introduced oscillation. This additional active influence on the internal pressure of the cushioning fluid within the deformable fluid spring element makes it possible, in particular with regard to the vehicle seat according to the invention, to actively modulate the present deformable fluid spring element with regard to its cushioning performance during its cushioning activity, thus allowing for the provision of a horizontal spring device which can be adapted particularly well to the current oscillation excitations.

It is particularly advantageous for the internal pressure to be actively increased from the exterior either prior to or during a first cushioning movement in the main cushioning direction, whereas the internal pressure is actively reduced from the exterior either prior to or during a cushioning movement counter to the first cushioning movement in order to prevent a build-up of oscillation due to excessive restoring forces of the deformable fluid spring element.

In order to be able to actively vary the internal pressure of the cushioning fluid within the cavity of the deformable fluid spring element, in particular in relation to a current cushioning situation, it is advantageous for the horizontal spring device to also comprise a device for measuring an acceleration and/or a movement path with respect to the spring parts of the horizontal spring device. In this manner, the required springiness of the deformable fluid spring element can be determined particularly well, thus always allowing for optimum selection of the spring characteristic of this deformable fluid spring element for the relevant spring path or movement in terms of forwards and backwards cushioning.

It goes without saying that it is advantageous for there to be on the vehicle seat a correspondingly suitable device for active feeding or removal of a cushioning fluid, such as a compressor device and/or a reservoir device for storing a cushioning fluid.

In this arrangement, the compressor device and/or reservoir device are in an operative fluid connection with the cavity of the deformable fluid spring element in such a way that a cushioning fluid can be added to or removed from this cavity as required, depending on which current cushioning requirements are placed on the deformable fluid spring element.

Other advantages, aims and properties of the present invention are explained with reference to the accompanying drawings and subsequent description in which, by way of example, an advantageous integration of a deformable fluid spring element in a horizontal spring device of a vehicle seat is shown and described.

BRIEF DESCRIPTION OF THE DRAWINGS

Figs. 2A-2C depict a series of schematic side views of the fluid spring element in various cushioning positions, which element is deformable solely by the seat-part-side upper part and the body-side lower part and is integrated in the vehicle seat from FIG. 1; and FIG. 3 is another schematic view of the deformable fluid spring element from Figs. 2A-2C having a provisioning device attached thereto for providing an additional volume of cushioning fluid.

DETAILED DESCRIPTION

Figure 1:
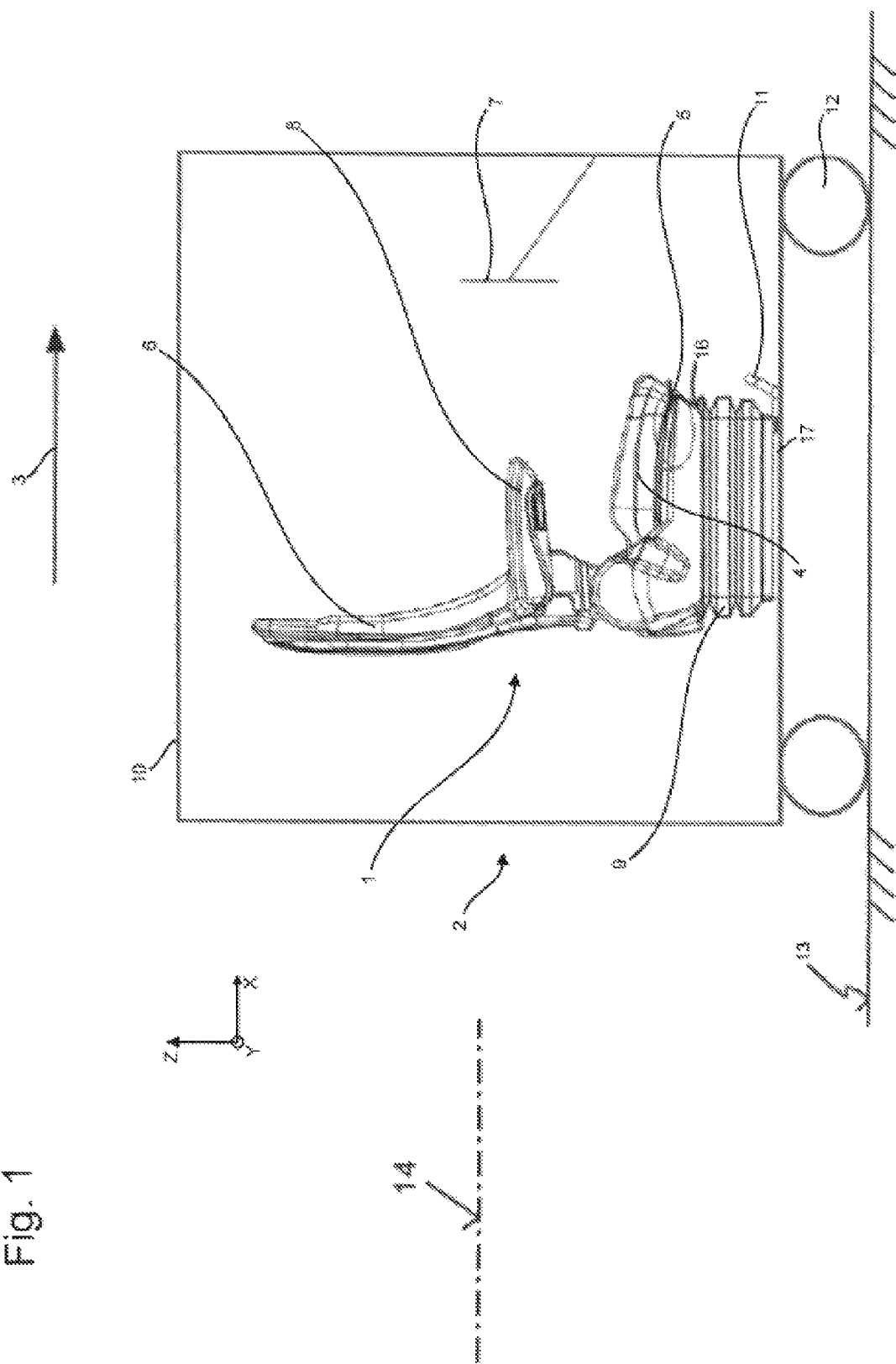
FIG. 1 is a schematic side view of a vehicle seat which is arranged in a vehicle and has a deformable fluid spring element which is fixed solely to a seat-part-side upper part of a horizontal spring device and to a body-side lower part of the horizontal spring device.

The vehicle seat 1 shown schematically in FIG. 1 is arranged so as to be fitted in a vehicle 2 so as to be oriented in the forward travel direction 3. In this respect, said seat is arranged so as to be oriented in the vehicle lengthwise direction X and has a seat surface 4, which belongs to a seat part 5 and extends in the vehicle width direction Y and in the vehicle lengthwise direction X, and a backrest part 6, which extends in the vehicle height direction Z and is preferably pivotally arranged with respect to the seat part 5. The vehicle seat 1 is placed in front of a steering wheel 7, which can be easily operated by a person sitting on the vehicle seat 1. Furthermore, at least one arm rest 8 is arranged on the vehicle seat 1, in particular on the backrest part 6 thereof, in order to enhance driving comfort for the person.

In addition, the vehicle seat 1 also has a seat substructure 9, by means of which the vehicle seat 1 is fixed to a body 10 of the vehicle 2. An actuation lever 11 of a displacement device (not shown) can also be seen on the seat substructure 9 and used to move the vehicle seat 1 horizontally in the vehicle longitudinal extension X when the displacement device is released by actuation of the actuation lever 11. The vehicle 2 shown in FIG. 1 stands, by means of its wheels 12 (numbered here only by way of example), on a ground 13 and, relative to this ground 13, is aligned with an imaginary horizontal plane 14, meaning that the vehicle seat 1 too and in particular the seat part 5 are not at an incline with respect to this imaginary horizontal plane 14.

The seat substructure 9 additionally has a plurality of cushioning- and/or damping devices (not shown in detail). As a result, the seat part 5 in particular is arranged in the vehicle 2 so as to be well cushioned and/or damped with respect to the body 10, meaning that a particularly high level of driving comfort can be achieved for the person sitting on the vehicle seat 1. In particular the cushioning- and/or damping devices can cushion and/or damp the vehicle seat 1 in the horizontal direction with respect to the vehicle lengthwise direction X and/or the vehicle width direction Y, as well as in the vertical direction according to the vehicle height direction Z.

In particular, the seat substructure 2 comprises a horizontal spring device 15, which is shown schematically in Figs. 2A-2C and 3 in its main function and has a first spring part 16 and another spring part 17, between which a deformable fluid spring part 18 can be arranged so as to interact in such a way that specifically the first spring part 16 is fitted so as to be movable relative to the other spring part 17 in the main cushioning direction 19 or horizontal cushioning direction.

In this embodiment, the deformable fluid spring element 18 is a pneumatic spring element (not numbered here).

The first spring part 16 comprises in this case the seat-part-side upper part 16A and the other spring part 17 comprises the body-side lower part 17A.

While, at a first connecting region 20, the deformable fluid spring element 18 is articulated by means of a floating bearing 21 to the seat-part-side upper part 16A so as to be movable in rotation, it is rigidly fixed at another connecting region 22 by means of a fixed bearing 23 to the body-side lower part 17A.

According to the invention, these two connection regions 20 and 22 form the sole working devices for deforming the deformable fluid spring element 18 when cushioning the horizontal spring device 15 in the main cushioning direction 19.

In this respect, the deformable fluid spring element 18 is arranged between the two spring parts 16, 17 so as to be deformed solely by the two spring parts 16, 17 upon relative movement of these two spring parts 16, 17 relative to each other in the main cushioning direction 19.

The floating bearing 21 is distinctive in this embodiment on account of a lever element 24 and a pivot joint 25, the floating bearing 21 forming a length-compensating device 26, with respect to the first spring part 16, on a first end 27 of the deformable fluid spring element 18, which device can compensate a change in the length of the deformable fluid spring element 18 that is generated transversely to the main cushioning direction 19.

At its end 28 opposite the first end 27, the deformable fluid spring element 18 is, as aforesaid, rigidly connected to the other spring part 17.

The lever element 24 is secured by means of a secure screw connection (not explicitly shown here) to the fluid spring element 18. An excursion of the seat-part-side upper part 16A with respect to the body-side lower part 17A, or vice versa, is thus only possible as a result of shearing or deformation of the fluid spring element 18, as can be clearly seen from the three superposed views in Figs. 2A-2C.

The deformable fluid spring element 18 has an oblong, tubular and elastically deformable main body 30, such that these two end regions 27 and 28 are the most spaced-apart end regions of the deformable fluid spring element 18.

The oblong, tubular and elastically deformable main body 30 has a closed cavity 31 which can be filled with a volume of cushioning fluid (not numbered here), in particular according to a measured spring path 32 or 33.

In this respect, cushioning or neutral position correcting can be achieved in both the direction of a first cushioning movement 19A (see FIG. 3) and the direction of a counter cushioning movement 19B in the main cushioning direction 19.

The deformable fluid spring element 18 can be fed via a fluid agent conduit connection 35 by a fluid agent reservoir 36 and/or a compressor 37, an air inlet and outlet valve 38 having a regulating element 39 also being integrated in the fluid agent conduit connection 35.

Instead of the fluid agent reservoir 36 and/or the compressor 37, provision could also be made for a fluidic attachment to an air pressure network (not shown here) of the vehicle 2.

For the sake of completeness, the following comments can also be made on this embodiment:

The deformable fluid spring element 18 seeks to align itself longitudinally under increasing pressure. If, as in the views shown, said element is fixed at its ends 27 and 28, only shear forces occur upon deformation of the deformable fluid spring element 18. These backward shear forces, which act in the counter direction to the excursion, can be corrected by applying pressure.

Shearing of the deformable fluid spring element 18 is easier with a pressureless or only slightly pressurised fluid spring element 18 since the spring constant is then lower. Where operation is level and smooth, a soft spring characteristic is expedient for light and heavier drivers alike, for the purposes of oscillation isolation.

With increasing excursion, and also with increasing driver weight, there is a rise in the pressure and thus the counter force of the deformable fluid spring element 18 in order to counteract an impact against end stops (not shown here). This shearing somewhat shortens the deformable fluid spring element 18 in the height 40 shown (see FIG. 3), thus making at least the pivot bearing or pivot joint 25 necessary. In addition, owing to the pivot joint 25, the rest of the guide system is not claimed as transverse.

Upon restoration, the pressure is released from the deformable fluid spring element 18, thus reducing the restoring force and thereby preventing rebound-induced oscillation build-up.

Clearly, at least one position-measuring system (not shown) or, in some circumstances, also an acceleration measuring system (not shown here) is also required for detecting the current excitation simultaneously with the current position in each spring path 32 and 33.

A long-term departure from the central rest position or an excursion from the horizontal zero position 41, for example upon operation when driving up- or downhill, can be counteracted by means of continuous pressure accumulation (increasing spring characteristic), thus ensuring in turn adequate spring travel.

Owing to the form and nature of the deformable fluid spring element 18, an additional progression can be worked into the spring characteristic upon shearing or a pressure increase.

A further progression in the spring characteristic can ideally be achieved by further limiting the movement in the pivot joint 25 when the emerging expansion acts as a further force increase in the excursion as a result of shortening of the deformable fluid spring element 18 upon pressure increase.

In this case too, contact surfaces could also be provided cumulatively for the deformable fluid spring element 18 to produce an additional force increase in the excursion.

It goes without saying that the embodiment set out about is merely a first embodiment of the invention. The configuration of the invention is thus not limited to this embodiment.

All the features disclosed in the application documents are claimed as being essential to the invention provided that they are novel over the art either in isolation or in combination.

LIST OF REFERENCE SIGNS

1 Vehicle seat
2 Vehicle
3 Forward travel direction
4 Seat surface
5 Seat part
6 Backrest part
7 Steering wheel
8 Arm rest
9 Seat substructure
10 Body
11 Actuation lever
12 Wheels
13 Ground
14 Imaginary horizontal plane
15 Horizontal spring device
16 First spring part
16A Seat-part-side upper part
17 Other spring part
17A Body-side lower part
18 Deformable fluid spring part
19 Main cushioning direction
19A First spring movement
19B Second spring movement
20 First connecting region
21 Floating bearing
22 Other connecting regions
23 Fixed bearing
24 Lever element
25 Pivot joint
26 Length-compensating device
27 First end
28 Opposite end
30 Main body
31 Cavity
32 Front spring path
33 Rear spring path
35 Fluid agent conduit connection
36 Fluid agent reservoir
37 Compressor
38 Air inlet and outlet valve 39 Regulating element
40 Height
41 Horizontal zero position
X Vehicle lengthwise direction
Y Vehicle width direction
Z Vehicle height direction

What is claimed is:

1. A vehicle seat having a seat part extending in a vehicle length direction (X) and in a vehicle width direction (Y) and having a backrest part and a seat substructure for cushioning and/or damping at least the seat part with respect to a body of a vehicle, in which the seat substructure comprises at least one horizontal spring device having a first spring part, and a second spring part which is movable relative thereto and a deformable fluid spring element for cushioning the seat part with respect to the body in the vehicle length direction (X) and/or in the vehicle width direction (Y), the deformable fluid spring element being arranged with a first connecting region to the first spring part and a second connecting region to the second spring part, wherein the deformable fluid spring element is arranged between the first and second spring parts so as to be deformed solely by the first and second spring parts upon relative movement of the first and second spring parts relative to each other along the at least one of the vehicle length direction (X) and the vehicle width direction (Y), wherein the deformable fluid spring element is subjected to shear forces by the movement of the first and second spring parts relative to each other, and wherein the deformable spring element resists the shear forces.

2. The vehicle seat according to claim 1, wherein the first and second connecting regions of the deformable fluid spring element are the sole engagement regions by means of which the deformable fluid spring element is deformable upon relative movement of the first and second spring parts relative to each other.

3. The vehicle seat according to claim 1, wherein the deformable fluid spring element is always held and guided solely by the first and second spring parts arranged with mutual spacing transversely to a main cushioning direction.

4. The vehicle seat according to claim 3, wherein the first and second connecting regions of the deformable fluid spring element are held on the first and second spring parts so as to be slidable in parallel with each other in the main cushioning direction.

5. The vehicle seat according to claim 3, wherein the deformable fluid spring element is arranged, at least in the main cushioning direction, so as to oscillate freely between the first and second spring parts.

6. The vehicle seat according to claim 1, wherein the deformable fluid spring element has an oblong configuration and is fixed to the first and second spring parts by means of each of its most spaced-apart end regions.

7. The vehicle seat according to claim 1, wherein the deformable fluid spring element is fixed to one of the two spring parts by means of a fixed bearing and to the other of the two spring parts by means of a floating bearing.

8. The vehicle seat according to claim 1, wherein the deformable fluid spring element has, at one of its ends, a length-compensating device which acts transversely to a main cushioning direction.

9. The vehicle seat according to claim 8, wherein the length-compensating device comprises a lever element which is arranged hingedly on one of the first and second spring parts.

10. The vehicle seat according to claim 1, wherein the deformable fluid spring element comprises an oblong, tubular and resilient main body which has a closed cavity which can be filled with a volume of cushioning fluid according to a measured spring path.

11. A method for cushioning a first and a second spring part which are movable relative to each other and belong to a horizontal spring device of a vehicle seat having a seat part and a backrest part, in which the first and second spring parts are cushioned relative to each other by means of a deformable fluid spring element subjected to shear forces by movement of the vehicle seat relative to a vehicle body in at least one of the vehicle length direction (X) and the vehicle width direction (Y), wherein the deformable fluid spring element resists the shear forces, and wherein an internal pressure within the deformable fluid spring element is actively varied from the exterior according to at least one of an intensity of an introduced oscillation and a measured spring path in order to adapt the spring characteristic to the current introduced oscillation.

12. The method according to claim 11, wherein the internal pressure is actively increased from the exterior either prior to or during a first cushioning movement in a main cushioning direction, whereas the internal pressure is actively reduced either prior to or during a restoring cushioning movement counter to the first cushioning movement in order to prevent a build-up of oscillations due to excessive restoring forces of the deformable fluid spring element.

13. The vehicle seat according to claim 1, wherein the first and second connecting regions of the deformable fluid spring element are held by the first and second spring parts respectively so as to be moveable in parallel relative to one another in the at least one of the vehicle length direction (X) and the vehicle width direction (Y).

14. The vehicle seat according to claim 1, wherein the deformable fluid spring element extends in an elongate manner transversely to the at least one of the vehicle length direction (X) and the vehicle width direction (Y).

15. A vehicle seat, comprising:
a seat part extending in a vehicle length direction (X) and in a vehicle width direction (Y); and
a seat substructure, including:
at least one horizontal spring device, including:
a first spring part, wherein the first spring part is connected to the seat part;
a second spring part, wherein the second spring part is connect to a vehicle body; and
a deformable spring element,
wherein a first connecting region of the deformable spring element is connected to the first spring part,
wherein a second connecting region of the deformable spring element is connected to the second spring part,
wherein the deformable fluid spring element is arranged between the first and second spring parts so as to be deformed solely by the first and second spring parts,
wherein movement of the seat part relative to the vehicle body in at least one of the vehicle length direction (X) and the vehicle width direction (Y) subjects the deformable spring element to a shear force, and
wherein the deformable spring element resists the shear force.

16. The vehicle seat of claim 15, wherein the first and second connecting regions of the deformable spring element are held by the first and second spring parts respectively so as to be moveable in parallel relative to one another in the at least one of the vehicle length direction (X) and the vehicle width direction (Y).

17. The vehicle seat of claim 15, wherein the deformable spring element extends in an elongate manner transversely to the at least one of the vehicle length direction (X) and the vehicle width direction (Y).

18. The vehicle seat according to claim 15, wherein the first and second connecting regions of the deformable spring element are the sole engagement regions by means of which the deformable spring element is deformable upon relative movement of the first and second spring parts relative to each other.

19. The vehicle seat according to claim 15, wherein the deformable spring element is fixed to one of the two spring parts by means of a fixed bearing and to the other of the two spring parts by means of a floating bearing.

20. The vehicle seat according to claim 15, wherein the deformable spring element comprises an oblong, tubular and resilient main body which has a closed cavity which can be filled with a volume of cushioning fluid according to a measured spring path.

\* \* \* \* \*